US005804247A

United States Patent [19]
Cherukuri et al.

[11] Patent Number: 5,804,247
[45] Date of Patent: *Sep. 8, 1998

[54] POSITIVE HYDRATION METHOD OF PREPARING CONFECTIONARY AND PRODUCT THEREFROM

[75] Inventors: Subraman R. Cherukuri, Towaco, N.J.; Robert K. Yang, Flushing, N.Y.; Cecil A. Bowles, Sioux City, Iowa; Jose F. Zamudio-Tena, Vienna; Santi R. Bhowmik, Chesapeake, both of Va.

[73] Assignee: Fuisz Technologies Ltd., Chantilly, Va.

[ * ] Notice: The term of this patent shall not extend beyond the expiration date of Pat. No. 5,587,198.

[21] Appl. No.: 770,859

[22] Filed: Dec. 20, 1996

Related U.S. Application Data

[63] Continuation of Ser. No. 455,936, May 31, 1995, Pat. No. 5,587,198.

[51] Int. Cl.⁶ ..................................... A23G 3/00
[52] U.S. Cl. ........................ 426/660; 426/658; 426/572
[58] Field of Search ................... 426/660, 658, 426/572, 564, 613, 103; 424/78.02, 439; 127/58, 30

[56] References Cited

U.S. PATENT DOCUMENTS

| Re. 32,016 | 10/1985 | Esders et al. ................. 435/28 |
| 796,528 | 8/1905 | Pollock .......................... 425/9 |
| 816,055 | 3/1906 | Zoeller .......................... 425/9 |
| 847,366 | 3/1907 | Pollock .......................... 425/9 |
| 856,424 | 6/1907 | Robinson ....................... 425/9 |
| 1,489,342 | 4/1924 | Brent ............................. 425/9 |
| 1,541,378 | 6/1925 | Parcell .......................... 425/9 |
| 2,918,404 | 12/1959 | Mende et al. ................. 167/58 |
| 3,019,745 | 2/1962 | Du Bois et al. ............... 107/8 |
| 3,036,532 | 5/1962 | Bowe ............................. 107/8 |
| 3,067,743 | 12/1962 | Merton et al. ................ 128/270 |
| 3,070,045 | 12/1962 | Bowe ............................. 107/8 |
| 3,073,262 | 1/1963 | Bowe ............................. 107/8 |
| 3,095,258 | 6/1963 | Scott ............................. 18/54 |
| 3,118,396 | 1/1964 | Brown et al. .................. 107/8 |
| 3,118,397 | 1/1964 | Brown et al. .................. 107/8 |
| 3,125,967 | 3/1964 | Bowe ............................. 107/8 |
| 3,131,428 | 5/1964 | Mika ............................. 18/8 |
| 3,308,221 | 3/1967 | Opfell .......................... 264/174 |
| 3,324,061 | 6/1967 | Tanquary et al. ............. 260/29.2 |
| 3,396,035 | 8/1968 | Kessinger ..................... 99/94 |
| 3,482,998 | 12/1969 | Carroll et al. ................ 99/108 |
| 3,523,889 | 8/1970 | Eis ............................. 210/20 |
| 3,557,717 | 1/1971 | Chivers ........................ 107/54 |
| 3,557,718 | 1/1971 | Chivers ........................ 425/7 |
| 3,595,675 | 7/1971 | Ash et al. ..................... 99/130 |
| 3,615,671 | 10/1971 | Schoaf ......................... 99/78 |
| 3,625,214 | 12/1971 | Higuchi ........................ 128/260 |
| 3,676,148 | 7/1972 | De Weese et al. ............ 99/1 |
| 3,686,000 | 8/1972 | Lawrence ..................... 424/21 |
| 3,723,134 | 3/1973 | Chivers ........................ 99/134 |
| 3,749,671 | 7/1973 | Gedge et al. ................. 252/89 |
| 3,762,846 | 10/1973 | Chivers ........................ 425/7 |
| 3,766,165 | 10/1973 | Rennhard .................... 260/209 |
| 3,856,443 | 12/1974 | Salvi ............................ 425/9 |
| 3,875,300 | 4/1975 | Homm et al. ................ 424/28 |
| 3,876,794 | 4/1975 | Rennhard .................... 426/152 |

(List continued on next page.)

FOREIGN PATENT DOCUMENTS

| 609135 | 4/1988 | Australia . |
| 609137 | 4/1988 | Australia . |
| 900605 | 11/1977 | Belgium . |
| 1303511 | 4/1988 | Canada . |
| 0 158 460 A1 | 3/1985 | European Pat. Off. . |
| 0 287 488 A1 | 3/1988 | European Pat. Off. . |
| 0 387 950 A1 | 8/1990 | European Pat. Off. . |
| 86052 | 4/1988 | Israel . |
| 86053 | 4/1988 | Israel . |
| 88/2770 | 4/1988 | South Africa . |
| 88/2771 | 4/1988 | South Africa . |
| 89/9318 | 12/1989 | South Africa . |
| 90/2139 | 3/1990 | South Africa . |
| 90/8406 | 8/1991 | South Africa . |
| 519858 | 5/1971 | Switzerland . |
| 489211 | 7/1986 | Switzerland . |
| 2 155 934 | 3/1985 | United Kingdom . |
| WO 85/03414 | 1/1985 | WIPO . |
| WO 91/18613 | 5/1991 | WIPO . |

OTHER PUBLICATIONS

R.H. Doremus, "Crystallization of Sucrose From Aqueous Solution," *Journal of Colloid and Interface Science*, 104, pp. 114–120 (1985).

P. Bennema,, "Surface Diffusion and the Growth of Sucrose Crystals, "*Journal of Crystal Growth*, 3,4 pp. 331–334 (1968).

T.D. Simpson, et al., "Crystalline Forms of Lactose Produced in Acidic Alcoholic Media," *Journal of food Science*, 47, pp. 1948–1954 (1982).

A.D. Randolph, et al., "Continuous Sucrose Nucleation," *The International Sugar Journal*, pp. 8–12 (1974).

K.B. Domovs, et al., "Methanol–Soluble Complexes of Lactose and of other Carbohydrates," *J. Dairy Science*, 43, pp. 1216–1223 (1960).

A.D. Randolph, et al., "Continuous Sucrose Nucleation," *The International Sugar Journal*, pp. 35–38 (1974).

A.D. Randolph, et al., "Continuous Sucrose Nucleation," *The International Sugar Journal*, pp. 73–77 (1974).

ICI Americas, Inc., "ICI Americas Products for Cosmetics and Pharmaceuticals," (1977).

Domino Sugar Corporation, "Co–crystallization".
Domino Sugar Corporation, "Raspberry".
Domino Sugar Corporation, "Molasses Dark".

*Primary Examiner*—Cynthia L. Nessler
*Attorney, Agent, or Firm*—John F. Levis

[57] ABSTRACT

The present invention is a new method of making a confectionery mass, such as a nougat, by hydrating sufficiently to form the mass without the need for cooking to drive off moisture. The present invention also includes a product prepared by positively hydrating a mixture of confectionery ingredients including a hydrobinding component and shearform product.

8 Claims, No Drawings

U.S. PATENT DOCUMENTS

| | | | |
|---|---|---|---|
| 3,907,644 | 9/1975 | Möllering et al. | 195/99 |
| 3,912,588 | 10/1975 | Möllering et al. | 195/29 |
| 3,925,164 | 12/1975 | Beaucamp et al. | 195/103.5 |
| 3,925,525 | 12/1975 | LaNieve | 264/40 |
| 3,930,043 | 12/1975 | Warning et al. | 426/515 |
| 3,951,821 | 4/1976 | Davidson | 252/1 |
| 3,972,725 | 8/1976 | Nicol | 127/58 |
| 3,981,739 | 9/1976 | Dmitrovsky et al. | 127/60 |
| 3,991,766 | 11/1976 | Schmitt et al. | 128/335.5 |
| 4,056,364 | 11/1977 | Dmitrovsky et al. | 23/273 |
| 4,072,658 | 2/1978 | Okamoto et al. | 260/49 |
| 4,086,418 | 4/1978 | Turbak et al. | 536/30 |
| 4,136,145 | 1/1979 | Fuchs et al. | 264/164 |
| 4,159,210 | 6/1979 | Chen et al. | 127/29 |
| 4,164,448 | 8/1979 | Röeschlau et al. | 435/11 |
| 4,166,005 | 8/1979 | Masurekar et al. | 436/190 |
| 4,168,205 | 9/1979 | Danninger et al. | 435/10 |
| 4,178,393 | 12/1979 | Gregersen | 426/653 |
| 4,186,251 | 1/1980 | Tarbutton | 435/11 |
| 4,194,063 | 3/1980 | Frank et al. | 435/12 |
| 4,199,373 | 4/1980 | Dwivedi et al. | 127/60 |
| 4,241,178 | 12/1980 | Esders et al. | 435/15 |
| 4,271,199 | 6/1981 | Cherukuri et al. | 426/5 |
| 4,293,292 | 10/1981 | Israel | 425/9 |
| 4,293,570 | 10/1981 | Vadasz | 426/3 |
| 4,303,684 | 12/1981 | Pitchon et al. | 426/312 |
| 4,335,232 | 6/1982 | Irwin | 528/128 |
| 4,338,350 | 7/1982 | Chen et al. | 426/658 |
| 4,348,420 | 9/1982 | Lynch et al. | 426/272 |
| 4,362,757 | 12/1982 | Chen et al. | 426/599 |
| 4,371,516 | 2/1983 | Gregory et al. | 424/22 |
| 4,376,743 | 3/1983 | Dees | 264/103 |
| 4,382,963 | 5/1983 | Klose et al. | 426/3 |
| 4,382,967 | 5/1983 | Koshida | 426/96 |
| 4,492,685 | 1/1985 | Keith et al. | 424/28 |
| 4,496,592 | 1/1985 | Kuwahara et al. | 426/5 |
| 4,500,546 | 2/1985 | Turbak et al. | 514/781 |
| 4,501,538 | 2/1985 | Bray | 425/9 |
| 4,504,508 | 3/1985 | Bell et al. | 426/549 |
| 4,511,584 | 4/1985 | Percel et al. | 426/99 |
| 4,526,525 | 7/1985 | Oiso et al. | 425/9 |
| 4,581,234 | 4/1986 | Cherukuri et al. | 426/3 |
| 4,585,797 | 4/1986 | Cioca | 514/773 |
| 4,619,833 | 10/1986 | Anderson | 426/548 |
| 4,622,717 | 11/1986 | Fuisz | 424/488 |
| 4,684,534 | 8/1987 | Valentine | 427/3 |
| 4,722,845 | 2/1988 | Cherukuri et al. | 426/5 |
| 4,747,881 | 5/1988 | Shaw et al. | 106/209 |
| 4,765,991 | 8/1988 | Cherukuri et al. | 426/3 |
| 4,772,477 | 9/1988 | Weiss et al. | 426/99 |
| 4,793,782 | 12/1988 | Sullivan | 425/7 |
| 4,797,288 | 1/1989 | Sharma et al. | 424/476 |
| 4,816,283 | 3/1989 | Wade et al. | 426/565 |
| 4,839,184 | 6/1989 | Cherukuri et al. | 426/307 |
| 4,846,643 | 7/1989 | Yamamoto et al. | 425/7 |
| 4,853,243 | 8/1989 | Kahn et al. | 426/564 |
| 4,855,326 | 8/1989 | Fuisz | 514/777 |
| 4,867,986 | 9/1989 | Desai et al. | 424/464 |
| 4,871,501 | 10/1989 | Sugimoto et al. | 264/211.22 |
| 4,872,821 | 10/1989 | Weiss | 425/9 |
| 4,873,085 | 10/1989 | Fuisz | 424/400 |
| 4,879,108 | 11/1989 | Yang et al. | 424/440 |
| 4,882,144 | 11/1989 | Hegasy | 424/80 |
| 4,885,281 | 12/1989 | Hanstein et al. | 514/53 |
| 4,900,563 | 2/1990 | Cherukuri et al. | 426/5 |
| 4,931,293 | 6/1990 | Cherukuri et al. | 426/5 |
| 4,933,192 | 6/1990 | Darling | 426/98 |
| 4,939,063 | 7/1990 | Tamagawa | 430/138 |
| 4,978,537 | 12/1990 | Song | 426/5 |
| 4,981,698 | 1/1991 | Cherukuri et al. | 426/5 |
| 4,988,529 | 1/1991 | Nakaya et al. | 426/569 |
| 4,997,856 | 3/1991 | Fuisz | 514/777 |
| 5,009,893 | 4/1991 | Cherukuri et al. | 424/440 |
| 5,009,900 | 4/1991 | Levine et al. | 426/96 |
| 5,011,532 | 4/1991 | Fuisz | 106/215 |
| 5,028,632 | 7/1991 | Fuisz | 514/772 |
| 5,034,421 | 7/1991 | Fuisz | 514/772 |
| 5,037,662 | 8/1991 | Poulose et al. | 426/52 |
| 5,039,446 | 8/1991 | Estell | 252/174.12 |
| 5,041,377 | 8/1991 | Becker et al. | 435/220 |
| 5,057,328 | 10/1991 | Cherukuri et al. | 426/5 |
| 5,066,218 | 11/1991 | Silver | 426/20 |
| 5,073,387 | 12/1991 | Whistler | 426/7 |
| 5,077,076 | 12/1991 | Gonsalves et al. | 426/565 |
| 5,079,027 | 1/1992 | Wong et al. | 426/633 |
| 5,082,682 | 1/1992 | Peterson | 426/564 |
| 5,082,684 | 1/1992 | Fung | 426/602 |
| 5,084,295 | 1/1992 | Whelan et al. | 426/565 |
| 5,089,606 | 2/1992 | Cole et al. | 536/54 |
| 5,094,872 | 3/1992 | Furcsik et al. | 426/578 |
| 5,096,492 | 3/1992 | Fuisz | 106/215 |
| 5,104,674 | 4/1992 | Chen et al. | 426/573 |
| 5,110,614 | 5/1992 | Corbin et al. | 426/555 |
| 5,164,210 | 11/1992 | Campbell et al. | 426/5 |
| 5,169,657 | 12/1992 | Yatka et al. | 426/5 |
| 5,169,658 | 12/1992 | Yatka et al. | 426/5 |
| 5,171,589 | 12/1992 | Richey et al. | 426/5 |
| 5,173,317 | 12/1992 | Hartman et al. | 426/6 |
| 5,173,322 | 12/1992 | Melachouris et al. | 426/580 |
| 5,175,009 | 12/1992 | Synosky et al. | 426/3 |
| 5,196,199 | 3/1993 | Fuisz | 424/401 |
| 5,236,734 | 8/1993 | Fuisz | 426/641 |
| 5,238,696 | 8/1993 | Fuisz | 426/641 |
| 5,268,110 | 12/1993 | Fuisz | 426/565 |
| 5,279,849 | 1/1994 | Fuisz et al. | 426/658 |
| 5,284,659 | 2/1994 | Cherukuri et al. | 424/441 |
| 5,286,513 | 2/1994 | Fuisz | 426/641 |
| 5,288,508 | 2/1994 | Fuisz | 426/5 |
| 5,346,377 | 9/1994 | Bogue | 425/9 |
| 5,348,758 | 9/1994 | Fuisz et al. | 426/660 |
| 5,374,447 | 12/1994 | Fuisz | 426/641 |
| 5,380,473 | 1/1995 | Bogue et al. | 264/11 |
| 5,387,431 | 2/1995 | Fuisz | 426/658 |
| 5,407,676 | 4/1995 | Fuisz | 424/401 |
| 5,422,136 | 6/1995 | Fuisz | 426/658 |
| 5,429,836 | 7/1995 | Fuisz | 426/601 |
| 5,518,551 | 5/1996 | Battist et al. | 127/58 |
| 5,587,198 | 12/1996 | Cherukuri et al. | 426/660 |

POSITIVE HYDRATION METHOD OF PREPARING CONFECTIONARY AND PRODUCT THEREFROM

This application is a continuation of copending application Ser. No. 08/455,936, filed on May 31, 1995, now U.S. Pat. No. 5,587,198.

BACKGROUND OF THE INVENTION

The present invention relates to the art of confectionery manufacturing, and, in particular, to novel methods of making a functionalized confectionery mass which does not require cooking to dehydrate, and product(s) therefrom.

It is generally considered a necessity in the art of preparing confectionery masses, such as nougats, to use water as a mixing medium and source of hydration for ingredients. Specifically with respect to nougats, a typical recipe calls for soaking egg albumen in water over a period of time, such as overnight, in order to fully hydrate the protein. Following hydration, the egg albumen is stirred and strained before being beaten into a stiff foam. Other ingredients such as sugar, honey, and corn syrup are separately cooked together with water to a temperature of from about 135° to about 138° C. The cooked mixture is then poured into the egg and beaten with a nougat mixer, which is similar to a marshmallow mixer but generally more robust. Additional parts of sugar and other ingredients must then be added and the mixture beaten or stirred over a hot water bath. Excessive water is required in the preparation of the nougat to serve as a mixing medium and source of hydration. Consequently, moisture must be driven off as much as possible to provide structural integrity and consistency of the end product.

Prior art processes require excessive amounts of water to provide a mixing medium and to hydrate the components. With respect to hydration, water is supplied in more than sufficient quantity to ensure that specific ingredients are wetted and functionalized. With respect to use of water as a mixing medium, once again excessive amount of moisture is generally used so that ingredients can be contacted by suspension or dissolution in the medium. The overall process requires the use of far more moisture than is actually required to provide solubility of the ingredients which results in a coherent mass having structural integrity.

As a consequence of the use of excessive water to hydrate and as a mixing medium, the artisan is then required to reduce the unwanted additional moisture as best as possible. This is generally undertaken by a combination of mixing and boiling to drive the moisture off. This process is energy-inefficient and very costly. Moreover, it is ineffective to eliminate a significant amount of the moisture contained in the confectionery mass.

One of the unwanted results of inefficient dehydration is that water remains as a separate phase in the end product. This water is not bound to other ingredients and can be referred to as "free moisture" or "unbound water." Free moisture can detract from the end product because it weakens the structural integrity and/or reduces the quality of organoleptic perception. Free moisture has been identified in food art by "water activity."

Moreover, free moisture provides an environment in which micro-organisms can grow. Microbiological growth in food products has also been used to measure the existence of free moisture.

"Water activity" is measured as the ratio between the vapor pressure of water in an enclosed chamber containing a food and the saturation vapor pressure of water at the same temperature. Water activity is an indication of the degree to which unbound water is found and, consequently, is availability to act as a solvent or participate in destructive chemical and microbiological reactions.

Many food preservation processes attempt to eliminate spoilage by lowering the availability of water to microorganisms. Reducing the amount of free moisture or unbound water also minimizes other undesirable chemical changes which can occur in foods during storage. The processes used to reduce the amount of unbound water in foods include techniques like concentration, dehydration, and freeze drying. These processes require intensive energy and are not cost efficient.

As a result of the present invention, the above difficulties and other difficulties generally associated with the prior art have been overcome.

SUMMARY OF THE INVENTION

The present invention is a method of making a confectionery mass, especially a nougat, by a positive hydrating step and without need for dehydrating in order to produce the confectionery mass. The present invention also includes the product resulting from the new method of preparation.

The method of the present invention primarily includes the use of flash-flow processing to prepare ingredients to create a "water-starved," but functional, confectionery mass. Flash-flow processing opens the structure of the components to increase its ability to hydrate, e.g., enhance wettability. Flash-flow processing also mixes ingredients and brings them into intimate contact with each other. Flash-flow processing can be performed by either flash-heat processing or a flash-shear processing as defined herein.

In one preferred embodiment, shearform matrix is combined with a hydrated hydrobinding component. The hydrobinding component can also be subjected to flash-flow processing prior to hydration. When the hydrobinding component is flash-flow processed, a saccharide-based material can be included in the feedstock to improve processability. The hydrobinding component can include a proteinaceous material such as a gelatin, or a food grade gum such as gum arabic, carrageenan, and mixtures thereof.

In another embodiment, the hydrobinding component can also be aerated, preferably in the presence of an aerating agent, prior to or after combining it with the shearform matrix. Aerating agents include, among other things, egg whites, soy protein, and combinations thereof.

A primary component of the shearform matrix can be a saccharide-based material such as sucrose, corn syrup solids, polydextrose, and mixtures thereof. A preferred saccharide-based ingredient is polydextrose. As previously mentioned, a saccharide-based ingredient can also be included with the hydrobinding component, especially when it is flash-flow processed prior to combining with the shearform matrix.

In a most preferred embodiment of the invention the saccharide-based ingredient, e.g. polydextrose, is subjected to flash-flow processing prior to flash-flow processing associated with mixing and hydration. This prior flash-flow processing is referred to herein as "pre-flash-flow processing."

It is further contemplated that active ingredients can be included in the confectionery mass which is formed as a result of the present invention. The active ingredients can be quite varied, and a non-exhaustive list has been set forth below in the section entitled "Detailed Description of the Invention."

In a most preferred embodiment of the present invention a nougat mass is prepared which has a frappe consistency and is made with nutritional ingredients so that a health product can be produced. In particular, vegetable and/or fruit components can be added to provide a nutritious food product. If desired, a product having the minimum daily nutritional requirements can be produced. In fact a "health bar" has been prepared which contains up to five (5) "U.S. recommended human adult dietary servings" of vegetable and/or fruit. ("The recommended human adult dietary serving" is defined by the Consumer Affairs Division of the United States Food and Drug Administration, which is incorporated herein by reference). Furthermore in this regard, ingredients which have strong olfactory characteristics, e.g., aroma and flavor, can be treated to enhance patentability before incorporating into a health product prepared in accordance with the invention.

The product resulting from the present invention is unique because it requires no cooking or dehydration by heating to produce, and has substantially no phase separation of moisture. The only moisture present is an amount sufficient to functionalize the mass. Thus, the product can be preparing without cooking.

It is well known that free moisture in food products can detract from the product. Free moisture has been identified in the art by the use of water activity. In the present invention, the water activity is not greater than 60% ERH, and is preferably not greater than about 55% ERH.

Another measure of free moisture in foodstuffs is the amount of biological growth within the composition. In the present invention, the biological activity is less than about 100 ppm, preerably less than about 25 ppm, and most preferably less than 10 ppm.

Excessive water previously required to mix and hydrate one or more ingredients is eliminated without dehydrating. Heat and mixing normally used to drive off excessive moisture are no longer required. Consequently, heat history generally associated with energy-intensive procedures is also eliminated.

The present invention also provides the ability to formulate confectionery masses with a significantly reduced fat and calorie content. This result is quite unexpected, since fat has traditionally been used to assist in functionalizing food masses by providing internal lubrication without water.

For a better understanding of the present invention, together with other and further objects, reference is made to the following description taken in conjunction with the examples, and the scope is set forth in the appended claims.

DETAILED DESCRIPTION OF THE INVENTION

The method for making confectionery mass in accordance with the present invention includes combining shearform matrix and a hydrobinding component, which is hydrated sufficiently to provide "controlled water delivery" to the shearform matrix and/or other ingredients. "Controlled water delivery" means delivery of water sufficient to provide internal viscosity and cohesivity to the shearform matrix, understanding, of course, that shearform matrix has significantly enhanced wettability because of a randomized structure resulting from flash-flow processing. The word "hydrated" as used in the term "hydrated hydrobound component" herein means sufficient water to provide "controlled water delivery."

The system created by the combination of the present invention is a "water-starved" system, which means having only enough moisture to bind the ingredients together and provide internal lubricity. Since the ingredients are competing for moisture due to enhanced wettability, there is virtually no free moisture available to separate from the mass.

Shearform matrix is prepared by flash-flow processing which mixes and conditions ingredients for intimate contacting and enhanced hydration. The hydrobinding component can also be subjected to flash-flow processing, preferably in the presence of a saccharide-based material, included as a carrier in the feedstock, before hydrating. The hydrobinding component can also be aerated, preferably in the presence of an aerating agent, before or after combining with the shearform matrix.

Another preferred embodiment of the present invention includes flash-flow processing of certain ingredients prior to combining with other ingredients as set forth hereinabove. This is referred to as pre-flash-flow processing. The saccharide-based material, e.g., polydextrose, can be pre-flash-flow processed. Flash-flow processing results in increased surface area and increased solubility of the ingredients subjected thereto, and contributes to actual binding of the ingredients to each other.

An important concept of the present invention is to increase the wettability of the ingredients of a confectionery mass sufficiently to functionalize the mass without the use of excess water. "Functionalization" of a confectionery mass means providing the ingredients with sufficient internal cohesivity to be handled without losing its integrity as a mass. In order to be "handled" in the context of functionalization, the mass must also possess internal lubricity which permits inter- and intra-particle movement without loss of cohesiveness. Functionalized food masses have been described as having the consistency of a dough, paste or as chewy, etc. However, the present invention is not to be limited by any "short-hand" description of the consistency.

Fat has been used in the past to functionalize food masses, and the present invention enables the artisan to functionalize a confectionery mass without need for added fat. Functionalization is achieved in the present invention by utilizing certain ingredients and flash-flow processing. However, selected amounts of fat may be added to obtain perceived texture and/or flavor characteristics.

In the present invention, a hydrobinding component is used in conjunction with flash-flow processing to provide a functionalized hydrobound confectionery mass. A functionalized "hydrobound confectionery mass" as used herein is a functionalized mass of confectionery ingredients which contains substantially no excessive free moisture or unbound water. A functionalized hydrobound confectionery mass of the present invention does not require dehydration to remove excess water.

While not bound by theory, it is believed that water is hydrobound because it is tightly bound to surface polar sites through chemisorption. These sizes may include the hydroxyl groups of hydrophilic materials such as proteins, gums, starches, and sugar.

A "hydrobinding component" is an ingredient which imbibes, delivers and maintains water in an amount sufficient to functionalize the resulting mass. The water which is hydrobound does not separate and become a separate phase. A "hydrobinding component" cooperates with other ingredients to deliver and maintain water sufficient to functionalize the mass of ingredients which have been subjected to flash-flow processing. Other ingredients are flash-flow processed in accordance with the invention. Flash-flow processing not only ensures intimate mixing without the use of water as a medium, but also conditions the ingredients for wetting with a minimum of water.

Thus, a hydrobinding component can be hydrated and mixed with shearform product (i.e., ingredients which have been subjected to flash-flow processing) to form a functionalized hydrobound confectionery mass. The hydrobinding component can also be subjected to flash-flow processing prior to hydration in order to enhance wettability. It is preferred to include a saccharide-based material with hydrobinding component when it is subjected to flash-flow processed-. After combining the hydrated hydrobinding component and the shearform matrix, moisture is readily imbibed and disseminated throughout the non-hydrated components and/or ingredients. Unlike prior art mixtures, additional moisture is not required to form a hydrated mixture. Thus, excess water is not present in the resulting mass.

The hydrobinding component and shearform matrix captures or binds sufficient moisture to functionalize the total mass. The ingredients capture the moisture physically, chemically and/or even biologically. Whatever the binding vehicle may be, water is held and made available for absorption by the remainder of the ingredients.

Hydrobinding components useful in the present invention include proteinaceous material, such as gelatin, and food grade gums, such as gum arabic, carrageenan, and mixtures thereof.

Ingredients which are used in the hydrobinding component can also be included in the shearform matrix component. Thus, gelatins and food grade gums such as gum arabic, carrageenan, et al., can be included in the feedstock used to prepare the shearform matrix.

Flash-flow processing prepares ingredients to be easily and quickly hydrated. Another very important result of flash-flow processing is intimate mixing of the ingredients. Intimate mixing has traditionally been achieved by use of water as a mixing medium. Flash-flow processing, however, intimately contacts ingredients and randomizes ingredient location and structure of the resulting matrix. Randomizing the structure can be thought of as opening the physical and/or chemical structure for hydration.

In one embodiment of the invention the saccharide-based material can be pre-flash-flow processed. For example, polydextrose, a preferred saccharide-based ingredient, can be pre-flash-flow processed.

The term "flash-flow" has become recognized in the art as referring to a process which uses conditions of temperature and force to transform a solid feedstock to a new solid having a different morphological and/or chemical structure. The term "flash-flow" is described in commonly-owned U.S. Pat. No. 5,236,734, issued Aug. 17, 1993 and U.S. Pat. No. 5,238,696, issued Aug. 24, 1993, as well as co-pending U.S. application Ser. No. 07/893,238, filed Jun. 30, 1992, now U.S. Pat. No. 5,518,730, U.S. application Ser. No. 07/847,595, filed Mar. 5, 1992, now U.S. Pat. No. 5,337,431 and U.S. application Ser. No. 099,200, filed Jul. 29, 1993, now U.S. Pat. No. 5,429,836, which are incorporated herein by reference.

In "flash-flow" processing, the time during which the feedstock material is subjected to elevated temperature is very short. Flash-flow processing can be accomplished either by a flash-heat method or a flash-shear method, as described further herein. In the flash-heat method, the feedstock is subjected to elevated temperature usually for only tenths of a second, and in the flash-shear method the feedstock is subjected to elevated temperatures for a time on the order of seconds.

In the flash-heat process, the feedstock is heated sufficiently to create an internal flow condition which permits internal movement of the feedstock at subparticle level and exit openings provided in the perimeter of a spinning head. The centrifugal force created in the spinning head flings the flowing feedstock material outwardly from the head so that it reforms with a changed structure. The force necessary to separate and discharge flowable feedstock is provided by centrifugal force and the force of the ambient atmosphere impinging on feedstock exiting the spinning head.

One apparatus for implementing a flash-heat process is a "cotton candy" fabricating type machine, such as the Econofloss model 3017 manufactured by Gold Medal Products company of Cincinnati, Ohio. Other apparatus which provides similar forces and temperature gradient conditions can also be used.

In the flash-shear process, shearform matrix is produced by raising the temperature of the feedstock, which includes a non-solubilized carrier such as a saccharide-based material, until the carrier undergoes internal flow upon application of a fluid shear force. The feedstock is advanced and ejected while in internal flow condition, and subjected to disruptive fluid shear force to form multiple parts or masses which have a morphology different from that of the original feedstock.

The flash-shear process can be carried out in an apparatus which has means for increasing the temperature of a non-solubilized feedstock and means for simultaneously advancing it for ejection. A multiple heating zone twin screw extruder can be used for increasing the temperature of the non-solubilized feedstock. A second element of the apparatus is an ejector which reduces the feedstock to a condition for shearing. The ejector is in fluid communication with the means for increasing the temperature and is arranged at a point to receive the feedstock while it is in internal flow condition. See commonly-owned U.S. Pat. No. 5,380,473, issued on Jan. 10, 1995 and entitled "Process for Making Shear-Form Matrix," which is incorporated herein by reference.

The feedstock for producing shearform matrix includes a carrier material. The carrier material can be selected from material which is capable of undergoing both physical and/or chemical change associated with flash-flow processing.

Materials which can be used as carrier materials in the feedstock include saccharide-base ingredients such as sucrose, corn syrup solids, polydextrose, and mixtures thereof.

Corn syrup solids are commonly known as maltodextrins. Maltodextrins are composed of water soluble glucose polymers obtained from the reaction of the starch with acid or enzymes in the presence of water. The hydrolysis reaction produces a carbohydrate mixture of saccharides having a dextrose equivalent (D.E.) of less than 20, or greater than 20 when the hydrolysis proceeds to produce what the FDA has termed corn syrup solids.

Polydextrose is a non-sucrose, essentially non-nutritive carbohydrate substitute. It can be prepared from polymerization of glucose in the presence of polycarboxylic acid catalysts and polyols. Generally, polydextrose is known to be commercially available in three forms: Polydextrose A and Polydextrose K, which are powdered solids, and Polydextrose N supplied as a 70% solution. Each of these products can also contain some low molecular weight components, such as glucose, sorbitol, and oligomers. Applicants incorporate herein the contents of commonly-owned U.S. Pat. No. 5,279,849 issued on Jan. 18, 1994.

Sugars can also be used as an ingredient in the feedstock. "Sugars" are those substances which are based on simple crystalline mono- a di-saccharide structures, i.e., based on $C_5$ and $C_6$ sugar structures. "Sugars" include sucrose, fructose, lactose, maltose and sugar alcohols such as sorbitol, mannitol, maltitol, etc.

Other materials which can be incorporated into the feedstock to enhance the shearform matrix include flavors, sweeteners, and surfactants (other than the carrier itself).

Flavors may be chosen from natural and synthetic flavoring liquids. An illustrative list of such agents includes volatile oils, synthetic flavor oils, flavoring aromatics, oils, liquids, oleoresins or extracts derived from plants, leaves, flowers, fruits, stems and combination thereof. A non-limiting representative list of examples includes citrus oils such as lemon, orange, grape, lime and grapefruit and fruit essences including apple, pear, peach, grape, strawberry, raspberry, cherry, plum, pineapple, apricot, or other fruit flavors.

Other useful flavorings include aldehydes and esters such as benzaldehyde (cherry, almond), citralm i.e., alphacitral (lemon, lime), neural, i.e., betacitral (lemon, lime) decanal (orange, lemon), aldehyde C-8 (citrus fruits), aldehyde C-9 (citrus fruits), aldehyde C-12 (citrus fruits), tolyl aldehyde (cherry, almond), 2,6-dimethyloctanal (green fruit), and 2-dodecenal (citrus, mandarin), mixtures thereof and the like.

The sweeteners may be chosen from the following non-limiting list: glucose (corn syrup), dextrose, invert sugar, fructose, and mixtures thereof (when not used as a carrier); saccharin and its various salts such as the sodium salt; dipeptide sweeteners such as aspartame; dihydrochalcone compounds, glycyrrhizin; Stevia Rebaudiana (Stevioside); chloro derivatives of sucrose such as sucralose; sugar alcohols such as sorbitol, mannitol, xylitol, and the like. Also contemplated are hydrogenated starch hydrolysates and the synthetic sweetener 3,6-dihydro-6-methyl-1-1-1,2,3-oxathiazin-4-one-2, 2-dioxide, particularly the potassium salt (acesulfame-K), and sodium and calcium salts thereof. Other sweeteners may also be used.

The surfactants may be chosen from the following non-limiting list; Lecithin, Hydrol, Durem, Myverol, and Paramount.

Additional materials which can be incorporated into the feedstock to enhance the shearform matrix include biologically active ingredients such as medicinal substances and antacids.

Medicinal substances which can be used in the present invention are varied. A non-limiting list of such substances is as follows: antitussives, antihistamines, decongestants, alkaloids, mineral supplements, laxatives, vitamins, antacids, ion exchange resins, anti-cholesterolemics, anti-lipid agents, antiarrhythmics, antipyretics, analgesics, appetite suppressants, expectorants, anti-anxiety agents, anti-ulcer agents, anti-inflammatory substances, coronary dilators, cerebral dilators, peripheral vasodilators, anti-infectives, psycho-tropics, antimanics, stimulants, gastrointestinal agents, sedatives, antidiarrheal preparations, anti-anginal drugs, vasodialators, anti-hypertensive drugs, vasoconstrictors, migraine treatments, antibiotics, tranquilizers, anti-psychotics, antitumor drugs, anticoagulants, antithrombotic drugs, hypnotics, anti-emetics, anti-nauseants, anti-convulsants, neuromuscular drugs, hyper- and hypoglycemic agents, thyroid and anti-thyroid preparation, diuretics, antispasmodics, uterine relaxants, mineral and nutritional additives, antiobesity drugs, anabolic drugs, erythropoietic drugs, antiasthmatics, cough suppressants, mucolytics, anti-uricemic drugs and mixtures thereof.

Especially preferred active ingredients contemplated for use in the present invention are antacids, $H_2$-antagonists, and analgesics. For example, antacid dosages can be prepared using the ingredients calcium carbonate alone or in combination with magnesium hydroxide, and/or aluminum hydroxide. Moreover, antacids can be used in combination with $H_2$-antagonists.

Analgesics include aspirin, acetaminophen, and acetaminophen plus caffeine.

Other preferred drugs for other preferred active ingredients for use in the present invention include antidiarrheals such as immodium AD, antihistamines, antitussives, decongestants, vitamins, and breath fresheners. Also contemplated for use herein are anxiolytics such as Xanax; antipsychotics such as clozaril and Haldol; non-steroidal anti-inflammatories (NSAID's) such as Voltaren and Lodine; antihistamines such as Seldane, Hismanal, Relafen, and Tavist; antiemetics such as Kytril and Cesamet; bronchodilators such as Bentolin, Proventil; antidepressants such as Prozac, Zoloft, and Paxil; antimigraines such as Imigran, ACr-inhibitors such as Vasotec, Capoten and Zestril; Anti-Alzheimers agents, such as Nicergoline; and $Ca^H$-Antagonists such as Procardia, Adalat, and Calan.

The popular H2-antagonists which are contemplated for use in the present invention include cimetidine, ranitidine hydrochloride, famotidine, nizatidine, ebrotidine, mifentidine, roxatidine, pisatidine and aceroxatidine.

Active antacid ingredients include, but are not limited to, the following: aluminum hydroxide, dihydroxyaluminum aminoacetate, amincacetic acid, aluminum phosphate, dihydroxyaluminum sodium carbonate, bicarbonate, bismuth aluminate, bismuth carbonate, bismuth subcarbonate, bismuth subgallate, bismuth subnitrate, calcium carbonate, calcium phosphate, citrate ion (acid or salt), amino acetic acid, hydrate magnesium aluminate sulfate, magaldrate, magnesium aluminosilicate, magnesium carbonate, magnesium glycinate, magnesium hydroxide, magnesium oxide, magnesium oxide, magnesium trisilicate, milk solids, aluminum mono- or dibasic calcium phosphate, tricalcium phosphate, potassium bicarbonate, sodium tartrate, sodium bicarbonate, magnesium aluminosilicates, tartari acids and salts.

Other active ingredients include antiplaque medicaments and medicaments for veterinary use.

Another component which can be included in products made in accordance with the present invention is a nutritional component. A nutritional component can include ingredients which have vitamins and minerals required to maintain good health. A "health bar" product has been prepared in accordance with the present invention which includes a dry residue of whole vegetables and/or fruits. In fact, a health bar product has been made which includes up to five (5) times the U.S. recommended human adult dietary serving of vegetables and/or fruit by incorporation of the dry residue of such fruits and vegetables. Sources of minerals and fiber can also be included.

A preferred embodiment of the nutritional form of the product contemplates treating ingredients having strong olfactory characteristics, e.g., flavor and aroma, to reduce such characteristics. For example, dry residue of spinach and broccoli have been treated by heating in the presence of yoghurt powder and a small amount of moisture to drive off strong aroma and flavor notes. This technique conditions such ingredients for incorporation in a health product without detracting from the overall smell and taste of the product. It has been found that the above technique is particularly effective for preparing a nutritional "health bar product."

One embodiment of the present invention includes flash-flow processing a hydrobinding component and subsequently hydrating the hydrobinding component. The hydrobinding component, e.g., the gelatin and/or gum, can be aerated, preferably in the presence of an aerating agent, before or after being combined with shearform matrix. Preferred aerating agents include egg whites and soy protein.

The confectionery ingredients of this embodiment can include the active ingredients and non-active ingredients described hereinabove.

The products resulting from the present invention are unique because they require no dehydration to produce, e.g., the product can be prepared without cooking. There is substantially no separation of moisture in the resulting product. The only moisture present is an amount sufficient to functionalize the mass.

The hydrobound system of the present invention is a mass which has been hydrated by adding moisture to provide hydrocolloidal stability, but which does not have measurable free water, e.g., syneresis is substantially halted. "Syneresis" is referred to as the phenomenon of separation of water from a mass of material as a distinct phase. When the moisture is so minimal in a mass or sufficiently bound to other components in the mass that phase separation does not occur, syneresis is stopped or halted. When syneresis occurs, free water is available within the system. Free water is generally unwanted in confectionery products of the type disclosed herein because of product deterioration and micro-organic growth. A correlation between free water and water activity has been made as a measure of product stability.

Many properties of foods are affected by the content and nature of water which they contain. Water participates in mass transfer and chemical reactions where it assumes a major role in determining physical and chemical content of foods. The production of a new food must almost inevitably confront the nature of water if the final product is to be stabilized with regard to nutritional content, microbial growth, and other factors.

A well-known method for characterizing the presence of water is by water activity. Water activity is measured as the ratio between the vapor pressure of water in an enclosed chamber containing a food and the saturation vapor pressure of water at the temperature. Water activity indicates the degree to which water is bound and, subsequently, available to act as a solvent or participate in destructive chemical and microbiological reactions.

When the water activity is low, water is unavailable because it is tightly bound to surface polar sites through chemisorption. Water activity is defined in the following manner.

$$a_w = \frac{p}{P_0}$$

where $a_w$ is water activity, p is the partial pressure of water above the sample, and $P_0$ is the vapor pressure of pure water at the same temperature (must be specified).

Another definition of water activity which is more thermodynamically appropriate is $$a_w = \frac{P_{eq}}{P_0}$$

where $P_{eq}$ is the partial vapour pressure of water in equilibrium with the solution and $P_0$ is the vapour pressure of pure water at the same temperature and pressure as the solution. When a solute is added to water, water molecules are "displaced" by solute molecules and the ratio of the vapour pressures or $a_w$ is altered. Entropy is also lowered as solute molecules become oriented to water molecules. As a result, water molecules are not as free to escape from the liquid phase and the vapour pressure is therefore decreased. This change is governed by Raoult's law, which states that the decrease in vapour pressure of a solution is equal to the mole fraction of its solute. Similarly the ratio of vapour pressures ($a_w$) is governed by the number of moles of solute ($n_1$) and solvent ($n_2$):

$$a_w = \frac{P}{P_0} = \frac{n_1}{n_1 + n_2}$$

Different solutes tie up or bind water to varying degrees depending on the nature of the solute, such as its level of dissociation, extent and nature of intramolecular binding, solubility and chemical components.

Further, a portion of total water content present in foods is strongly bound to specific sites on the chemicals that comprise the foodstuff. These sites may include the hydroxyl groups of polysaccharides, the carboxyl, amino groups of proteins, and other polar sites that may hold water by hydrogen bonding or other strong chemical bonds. In addition to strongly bound water molecules, some of the water in foods is usually bound less firmly but is still not available as a solvent for various water-soluble food component. Thus, water activity is low when water is tightly bound to surface polar sites through chemisorption. The sites can include hydroxyl groups of hydrophilic material which are effective in controlling water activity.

In the present invention water activity is significantly lower than water activity of similar products found in the candy bar industry. For example, candy bars usually have a water activity of 62%–68% equilibrium relative humidity (ERH). The confectionery product of the invention, however, has only a 60% ERH, and is preferably not greater than about 55% ERH.

Another measure of free water in foodstuffs can be provided by the amount of biological growth within the composition. In the present invention, the biological activity is less than about 100 ppm, preferably less than about 25 ppm, and most preferably less than 10 ppm.

Another distinctive feature of the present invention is the ability to reduce fat and calories in confectionery products. As a result of the present invention, a confectionery nougat product can be made which has little or no fat content. This product qualifies under industry standards to be referred to as "Reduced Fat" (which means the fat content is reduced by ⅓) and as "Low Fat" (which means the fat content is reduced by 50%).

For a better understanding of the present invention, together with other and further objects, the following examples and tables are provided to illustrate the unique methods of making a confectionery mass and products resulting therefrom.

EXAMPLE I

A shearform matrix was formed from the composition set forth in Table IA below. The sucrose, corn syrup solids and antacid components were blended to form a first mixture. Hydrogenated palm oil, and surfactants were combined under heat conditions sufficient to melt and form a second mixture. The second mixture was blended with the first mixture while still molten.

TABLE I A

| Ingredient | Percent of Composition |
|---|---|
| Sucrose | 29.74% |
| Corn Syrup Solids | 35.51% |
| Antacid (CaCO$_3$) | 21.00% |
| Hydrogenated Palm Oil | 11.46% |
| Emulsifiers | |
| (Lecithin) | 1.72% |
| (Mono-glyceride) | 0.57% |
| TOTAL | 100.00% |

The resulting mixture was cooled and subjected flash-flow processing by spinning in a flash-heat apparatus operated at about 3500 r.p.m. to produce a shearform matrix.

Separately, hydrobinding components were prepared by hydrating the Gelatin and Gum combination set forth in TABLE I B, and mixed at above room temperature until a smooth consistency was attained.

TABLE I B

| Ingredient | Percent of Composition |
|---|---|
| Hydrobinding Components | |
| Gelatin | 2.73% |
| Gum Arabic | 0.43% |
| Water | 8.00% |
| Shearform Matrix from Table IA | 87.29% |
| Color | 0.08% |
| Flavor | 0.47% |
| Glycerin | 1.00% |
| TOTAL | 100.00% |

Shearform matrix resulting from the preparation of TABLE IA was combined with color in a mixer and warmed to above room temperature. The hydrobinding components prepared as set forth above were then added to the colored shearform matrix. Flavors and glycerin were added while mixing.

The amount of moisture captured and delivered by the hydrobinding components was sufficient to hydrate the shearform matrix and functionalize the entire mass. The resulting system was a fully functional water-starved system, i.e., having virtually no separate water phase. The resulting mass was permitted to set in a pan, and subsequently separated into bite size squares (e.g., about 3.0 grams).

The resulting product was a well-formed excellent tasting nougat having well-structured integrity. The nougat was only modestly tacky. The nougat was an excellent dosage form for delivery of the antacid component, i.e., calcium carbonate.

EXAMPLE II

A shearform matrix was formed from the composition set forth in Table II A below. The surfactants were (pre-melted) and blended to form a first mixture. Antacid components, powder fructose, polydextrose, gum arabic (a non-hydrated hydrobinding ingredient), and flavors were blended separately to form a mixture. The first mixture was added while mixing. Glycerin was then added also while mixing.

TABLE II A

| Ingredient | Percent of Composition |
|---|---|
| Antacid | |
| (Calcium Carbonate) | 2.58% |
| Sweetener | |
| (Powder Fructose) | 20.79% |
| Saccharide | |
| (Polydextrose) | 46.57% |
| Coconut Oil | 2.58% |
| Emulsifiers | |
| (Glycerol Monostearate) | 0.52% |
| (Lecithin) | 1.29% |
| Flavors | |
| (Cocoa Powder) | 10.00% |
| (Vanilla Powder) | 0.21% |
| Hydrobinding Ingredient | |
| Gum Arabic | 12.88% |
| Glycerin | 2.58% |
| TOTAL | 100.00% |

The resulting mixture was cooled and subjected to flash-flow processing by spinning in a flash-heat apparatus operated at about 95° C. and at 3,600 rpm. to produce a shearform matrix.

Separately, a hydrobinding component was prepared by hydrating carrageenan according to the formula set forth in Table II B below. The ingredients in Table II B were blended thoroughly until a uniform solution was attained.

TABLE II B

| Ingredient | Percent of Composition |
|---|---|
| Carrageenan | 2.31% |
| Sucrose | 2.31% |
| Glycerin USP (anhydrous) | 3.08% |
| Water | 92.30% |
| TOTAL | 100.00% |

Finally, a confectionery mass was formed from the composition set forth in Table II C below. Shearform matrix resulting from the preparation of Table II A was combined with flavors and polydextrose, hand mixed, warmed to above room temperature, and permitted to cool. The hydrobound carrageenan prepared as set forth above was then added to the cooled shearform matrix.

TABLE II C

| Ingredient | Percent of Composition |
|---|---|
| Shearform Matrix from IIA | 64.80% |
| Flavors | |
| (Caramel Flavor) | 0.59% |
| (Vanilla Cream Flavor) | 0.26% |
| (Non-Fat Dry Milk) | 2.59% |
| Hydrobound Carrageenan | 11.01% |
| Polydextrose | 20.75% |
| TOTAL | 100.00% |

A homogenous water-starved system displaying substantially no moisture separation was produced. The resulting mass was deposited on a flat surface and permitted to set.

The resulting product was an attractive, excellent tasting candy having well-structured integrity, which is excellent for use as a "center" for a low calorie candy bar. Moreover, the candy was an excellent dosage formed for delivery of the antacid component, e.g., calcium carbonate.

EXAMPLE III

A spun matrix was formed from the composition set forth in Table III A below. Antacid components, corn syrups solids, sucrose, and flavors were blended to form a first mixture. Hydrogenated palm oil, emulsifiers and monoglyceride were combined and melted to form a second mixture, and lecithin was added thereto. The second mixture was blended with the first mixture

TABLE III A

| Ingredient | Percent of Composition |
| --- | --- |
| Antacid | |
| ($CaCO_3$) | 10.00% |
| Saccharides | |
| (Corn Syrup Solids) | 38.40% |
| (Sucrose) | 32.00% |
| Flavor | |
| Defatted Cocoa Powder 10–12% | 10.00% |
| Hydrogenated Palm Oil | 7.00% |
| Emulsifiers | |
| (Lecithin) | 2.00% |
| (Mono-glyceride) | 0.60% |
| TOTAL | 100.00% |

The resulting mixture was cooled and subjected flash-flow processing in a flash-heat apparatus having a 7-inch cable head which has a 0.030" gap to produce a shearform matrix.

Separately, a hydrobinding component was prepared by hydrating a gelatin and a gum with a glycerin in water combination as set forth in Table III B. The resulting hydrobound mass was mixed at above room temperature until a smooth consistency was attained.

TABLE III B

| Ingredient | Percent of Composition |
| --- | --- |
| Hydrobinding Component | |
| Gelatin Type B | 2.73% |
| Gum Arabic | 0.43% |
| Water | 8.00% |
| Glycerin | 1.00% |
| Shearform Matrix from Table III A | 87.69% |
| Flavors | |
| (Vanilla) | 0.05% |
| (Salt) | 0.10% |
| TOTAL | 100.00% |

Shearform matrix resulting from the preparation described in Table III A was combined with flavors in a mixer and warmed to above room temperature. The hydrobound mass prepared as set forth above was then added. The overall composition is set forth in Table III B.

The resulting composition was fully functional and displayed no water separation. A mass of the composition was laid out on a flat surface and rolled to a thickness of 10 cm, permitted to set, and cut into bars of desired shape and size. The resulting product was a well-formed, excellent tasting chewy nougat bar with low calorie content.

EXAMPLE IV

A non-hydrated confectionery shearform matrix was prepared from the composition set forth in Table IV A below. The resulting mixture was subjected to flash-flow processing by spinning in a flash-heat apparatus operated at about 3500 rpm. The resulting product was a non-hydrated shearform matrix. The product contained a non-hydrated hydrobinding ingredient and other components.

TABLE IV A

| Ingredient | Percent of Composition |
| --- | --- |
| Non-hydrated Shearform Matrix: | |
| Saccharides | |
| (Polydextrose) | 40.00% |
| (Powder Sucrose) | 35.86% |
| Flavors | |
| (Vanilla) | 1.00% |
| (Caramel) | 1.00% |
| (Non-Fat Dried Milk) | 6.34% |
| Emulsifier | |
| (Mono- and di-glyceride esters) | 0.25% |
| (Hydrogenated Vegetable Oil) | 0.25% |
| Antacid | 5.30% |
| (Calcium Carbonate) | |
| Hydrobinding Ingredient | 8.30% |
| (Gum Arabic) | |
| Glycerin | 1.70% |
| TOTAL | 100.00% |

A confectionery mass composition was then prepared in accordance with the formulation set forth in Table IV B. A hydrobinding component, gum arabic, was first hydrated with glycerin and water. The resulting hydrobound component was mixed with the other components resulting from Table IV A and a little salt.

TABLE IV B

| Ingredient | Percent of Composition |
| --- | --- |
| Non-hydrated Shearform Matrix of Table IVA | 59.75% |
| Hydrobinding Component | |
| Carrageenan | 0.25% |
| Glycerin | 3.00% |
| Water | 8.00% |
| Flavors | |
| Salt | 0.25% |
| Densified Rice | 6.75% |
| Bran Flakes | 5.00% |
| Raisins | 10.25% |
| Partially Defatted Peanuts | 6.75% |
| TOTAL | 100.00% |

Rice, bran flakes, and raisins were added to the resulting mixture to form a confectionery mass which was permitted to set on a flat surface, and subsequently smoothed out to 1 ½ inch thickness. The inclusion of particulate additives did not destroy the functional cohesiveness of the water-starved system.

The resulting product was a well-formed low fat, low calorie, caramel nougat candy bar center.

The products resulting from the invention (e.g. Examples I–IV) are quite unique. No cooking was required to prepare the compositions set forth above. Furthermore, the compositions did not require dehydration to arrive at the final product.

EXAMPLE V
FRAPPE PRODUCT

A product was prepared in accordance with the invention wherein the texture of the nougat was "shortened" to provide what has been referred to by the inventors as a "frappe" product.

A shearform matrix was prepared according to the formula set forth in Table V A.

TABLE V A

| Ingredient | Percent of Composition |
| --- | --- |
| Corn Syrup Solids | 10.93% |
| Polydextrose | 67.47% |
| Calcium Carbonate | 9.44% |
| Non-fat Dried Milk | 11.28% |
| Salt | 0.73% |
| High Intensity Sweeteners | |
| Aspartame | 0.09% |
| Acesulfame K | 0.06% |

The high intensity sweeteners were premixed with corn syrup solids and the salt, and subsequently blended with polydextrose, calcium carbonate and dry milk until a substantially uniform mix was achieved. The mixture was then flash-heat processed at about 3500 r.p.m. to produce a shearform matrix.

A hydrobinding component was separately prepared according to the formula described in Table V B, and then aerating agents and flavor ingredients were added in accordance with the formula set forth in Table V B.

TABLE V B

| Ingredient | Percent of Composition |
| --- | --- |
| Hydrobinding Component | |
| Carrageenan | 0.18% |
| Wetting Agent (Glycerin) | 3.82% |
| Water | 10.69% |
| Shearform Matrix (V A) | 45.82% |
| Aerating Agent | 0.46% |
| Soy Protein | |
| Flavor | |
| Vanilla | 0.23% |
| Creme | 0.15% |
| Caramel | 0.15% |
| Sugar | 22.91% |
| Peanut | 0.31% |
| Texture Agents | |
| De-fatted Peanuts | |
| Crisp Rice | 3.05% |
| Densified Crisp Rice | 3.05% |

Shearform matrix prepared in accordance with TABLE V A was separately mixed with Texture Agents in the percentages set forth in TABLE V B.

Subsequently, the hydrobinding component, aerating and flavor agents were combined with shearform matrix plus texture agents, and subjected to an aerating whisking for about 15 minutes.

The resulting product was a fully functional confectionery mass having substantially no water phase separation. The confectionery mass had an excellent flavor and shortened textured which is ideal for use as a low fat, low calorie nougat candy bar center.

EXAMPLE VI
FRAPPE PRODUCT

Another frappe product was prepared using a shearform matrix component having the formula set forth in TABLE VI A.

TABLE VIA

| Ingredients | Percent of Composition |
| --- | --- |
| Polydextrose | 88.78% |
| Flavor | |
| Peanut Butter | 7.14% |
| Oleaginous | 2.75% |
| Coconut Oil | |
| Salt | 1.32% |

The ingredients were combined and subjected to flash-heat processing to produce a shearform matrix.

The shearform matrix was then combined with the ingredients set forth in TABLE VI B (except for the solid texturizing ingredients peanuts and densified rice) and whipped to a stiff frappe consistency.

TABLE VI B

| Ingredients | Percent of Composition |
| --- | --- |
| Hydrobinding Component | |
| Protein Colloid (Gelatin) | 0.38% |
| Water | 10.70% |
| Wetting Agent Glycerin | 1.80% |
| Shearform Matrix (VI A) | 46.63% |
| Aerating Agent | 0.38% |
| Milk Protein | |
| Flavor | |
| Sweetener (Dextrose) | 14.31% |
| Connection Sugar | 2.86% |
| Polydextrose I | 0.50% |
| Peanut Butter Flavor | 0.50% |
| Texture Agents | |
| Densified Rice | 10.97% |
| Defatted Peanuts w/1% Salt | 10.97% |

The texture agents were subsequently added to form an excellent nougat candy bar center which was low calorie and low fat.

EXAMPLE VII
HEALTH BAR

A unique health product was prepared as a frappe product. The nougat frappe product provides the basis for a "health" bar. It can include up to at least five (5) times of the U.S. recommended human adult serving of whole vegetables and/or fruits by use of dry residue of such whole vegetables or whole fruit.

The composition of the product prepared in accordance with the invention is set forth in Table VII.

TABLE VII

Health Bar

| Ingredients | Percent of Composition |
|---|---|
| Shearform Matrix | |
| Polydextrose | 15.00% |
| Corn Syrup Solids | 8.50% |
| Non-fat Dry Milk | 4.00% |
| Wheat Protein Concentrate | 3.00% |
| Powdered Brown Sugar | 5.18% |
| Fiber Source | 4.39% |
| Calcium Carbonate | 1.00% |
| Salt | 0.60% |
| Vegetable Powder | 3.84% |
| Fruit Powder | 5.90% |
| Iron | 0.02% |
| Strong Olfactory Vegetable Component | |
| Broccoli Powder | 1.62% |
| Spinach Powder | 1.24% |
| Yoghurt Powder | 3.00% |
| Water | 0.18% |
| Hydrobinding Component | |
| Gum (Viscarin and Solka Floc) | 2.75% |
| Glycerin | 3.00% |
| Yoghurt Powder | 3.00% |
| Water | 8.82% |
| Sweeteners | |
| Fructose | 4.00% |
| Powdered Brown Sugar | 5.17% |
| High Intensity Sweeteners | 0.08% |
| Aerating Agent (Versa Whip) | 0.60% |
| Texturizing Agent | 5.37% |
| Rice Krispies | |
| Remaining Ingredients | |
| Vegetable Powder | 3.84% |
| Fruit Powder | 5.90% |

A shearform matrix was prepared using the ingredients set forth in Table VII. The ingredients were dry mixed and spun in a flash-heat apparatus.

Also, those ingredients which have strong vegetable-olfactory notes, e.g., spinach and broccoli powders, were treated to reduce the strength of the olfactory notes. Specifically, they were mixed with yoghurt powder in the presence of a trace of moisture and heated to drive off strong odor and flavor characteristics.

A hydrobinding component was separately prepared by hydrating gum and glycerin along with sweeteners and an aerating agent. The combination was blended and then whipped for three (3) minutes.

The shearform matrix and modified strong-vegetable olfactory component were added to the whipped composition. The texturizing agent and remaining ingredients were also added and the combination was mixed by beating for two (2) minutes.

The resulting product was transferred to a flat surface at the desired thickness and allowed to set for at least two (2) hours. The resulting product was a highly nutritious health bar filling which had a pleasing flavor and excellent texture.

The product was a sweet, fibrous bar which included dehydrated fruits, vegetables, dietary fibers and minerals. The product had no fat and was very low calorie, e.g., only about 120 calories per unit.

BIOLOGICAL ACTIVITY EXAMPLES

Moreover, products which were produced in accordance with the present invention have very low water activity and very low biological activity. The industry standard is well above the biological activity level exhibited from the inventive product.

EXAMPLE VIII

A first nougat was prepared using a shearform matrix having a formula set forth in Table VIII A.

TABLE VIII A

| Ingredients | Percent of Composition |
|---|---|
| Powdered Sugar | 35.86% |
| Polydextrose | 40.00% |
| Calcium Carbonate | 5.30% |
| Emulsifier (mono- and di-glyceride esters) | 0.25% |
| Hydrogenated Vegetable Oil | 0.25% |
| Gum Arabic | 8.30% |
| Glycerin | 1.70% |
| Flavorant | 2.00% |
| Non Fat Dried Milk | 6.34% |

A feedstock composed of the ingredients set forth above was flash-heat processed at temperatures of between 81°–85° C. and at a spin speed of 3600–3900 r.p.m.

The resulting shearform product was then used to prepare a nougat according to the formula set forth in Table VIII B.

TABLE VIII B

| Ingredients | Percent of Composition |
|---|---|
| Shearform Matrix from VIIIA | 59.75% |
| Hydrobinding Components | |
| Carrageenan | 0.25% |
| Glycerin | 3.00% |
| Water | 8.00% |
| Texture (and flavor) | |
| Densified Rice | 6.75% |
| Bran Flakes | 5.00% |
| Raisins | 10.25% |
| Partially Defatted Peanuts | 6.75% |
| Salt | 0.25% |

A hydrobinding component was prepared by mixing the carrageenan and glycerin and hydrating with the total water used in the final composition.

The shearform matrix and salt were then combined with the resulting hydrobinding component and subjected to 16–17 minutes of mixing to functionalize the mass. Texture ingredients were then added to the mass and folded in via low speed mixing until the inclusions were evenly coated.

The resulting mass was poured on a flat surface, rolled to a ½ inch thickness, and permitted to set. The resulting product had an excellent nougat flavor and texture. A sample of the product was tested for biological activity, and the results are reported in a "Biological Activity" Table set forth hereinafter.

EXAMPLE IX

A shearform matrix was prepared in accordance with the form set forth in Table IX B.

TABLE IX B

| Ingredient | Percent of Composition |
| --- | --- |
| Powdered Sugar | 34.50% |
| Polydextrose | 40.00% |
| Calcium Carbonate | 4.61% |
| Gum Arabic | 7.24% |
| Glycerin | 1.48% |
| Flavorant | 2.60% |
| Cocoa Powder | 3.26% |
| Non Fat Dried Milk | 5.51% |
| Salt | 0.36% |
| Oleaginous (Butter Oil) | 0.44% |

A feedstock composed of the ingredients set forth above were flash-heat processed at a temperature of from about 55° C. to about 60° C. at a spin speed of about 3600 r.p.m.

The shearform matrix was included in a nougat product prepared according to the formula set forth below in Table IX B.

TABLE IX B

| Ingredients | Percent of Composition |
| --- | --- |
| Shearform Matrix from IX A | 63.56% |
| Hydrobinding Component | |
| Carrageenan | 0.29% |
| Glycerin | 3.45% |
| Water | 9.21% |
| Flavors | |
| Sugar | 5.00% |
| High Intensity Sweetener | 0.04% |
| Butter Flavor | 0.30% |
| Malt Flavor | 0.15% |
| Texture | |
| Densified Rice | 9.00% |
| Partially Defatted Peanuts | 9.00% |

A hydrobinding component was prepared by combining carrageenan and glycerin and hydrating with water.

A functionalized nougat mass was then prepared by pre-combining the shearform matrix and salt, and subsequently mixing the pre-combined mixture with the hydrobinding component for 16–17 minutes. Texture ingredients were then folded in until the inclusions were evenly and thoroughly coated.

The resulting nougat mass was poured on a flat surface, smoothed to a thickness of about ½ inch and permitted to set. The product had an excellent flavor and texture.

A sample of the product was subjected to biological testing and the results are set forth hereinafter in the "Biological Activity" Table.

Report of Biological Tests

Samples of product from Examples VIII and IX were subjected to testing to determine biological activity. The test results are set forth below in the "Biological Activity" Table.

BIOLOGICAL ACTIVITY TABLE

| Sample | Standard Plate Count | E-Coli | Coliform | Salmonella | Yeast | Mold |
| --- | --- | --- | --- | --- | --- | --- |
| VIII | * < 10 | * < 10 | * < 10 | ** Negative | * < 10 | * < 10 |
| IX | * < 10 | * < 10 | * < 10 | ** Negative | * < 10 | * < 10 |

*Colony forming units per gram
**per 25 grains
All tests were conducted and reported in accordance with the United States Food and Drug Administration Bacteriological Analytical Manual (BAM), 7th Edition (1992).

As can be seen from the results reported in the Biological Activity Table, the biological activity is virtually non-existent. Normally, confectionery products can be expected to exhibit biological activity in the range of 300–400 ppm. The inventive samples tested displayed less than 10 colony form units per gram against standard bacteria, and negative results against Salomella.

Thus, while there have been described what are primary believed to be the preferred embodiments, those skilled in the art well appreciate that other and further changes and modifications can be made without departing from the true spirit of the invention, and it is intended to include all such changes and modifications within the scope of the claims which are appended hereto.

What is claimed is:

1. A method of making a confectionery mass comprising: forming a confectionery mass by combining a saccharide-based shearform matrix and a hydrated hydrobinding agent selected from the group consisting of food grade gums, gelatin and mixtures thereof, said hydrated hydrobinding agent present in an amount sufficient to hydrate said shearform matrix so as to provide internal cohesiveness and lubricity to said confectionery mass without causing syneresis and wherein said shearform matrix comprises at least one member selected from the group consisting of calcium and magnesium salts.

2. The method of claim 1 wherein said calcium salt is calcium carbonate.

3. The method of claim 1 wherein said magnesium salt is magnesium carbonate or magnesium oxide.

4. The method of claim 1 wherein said calcium salt is calcium carbonate and said magnesium salt is magnesium carbonate or magnesium oxide.

5. A confectionery comprising a functionalized hydrobound mass having substantially no phase separation of moisture, said confectionery having a saccharide-based shearform matrix and a hydrated hydrobinding agent selected from the group consisting of food grade gums, gelatins and mixtures thereof, said hydrated hydrobinding agent present in an amount sufficient to hydrate said shearform matrix so as to provide internal cohesiveness and lubricity to said confectionery, and wherein said shearform matrix comprises at least one member selected from the group consisting of calcium and magnesium salts.

6. The confectionery of claim 5 wherein said calcium salt is calcium carbonate.

7. The confectionery of claim 5 wherein said magnesium salt is magnesium carbonate or magnesium oxide.

8. The confectionery of claim 5 wherein said calcium salt is calcium carbonate and said magnesium salt is magnesium carbonate or magnesium oxide.

* * * * *